United States Patent Office.

W. B. LODGE, OF DANBURY, CONNECTICUT.

Letters Patent No. 69,921, dated October 15, 1867.

---

IMPROVEMENT IN HATS.

---

The Schedule referred to in these Letters Patent and making part of the same.

---

TO ALL WHOM IT MAY CONCERN:

Be it known that I, W. B. LODGE, of Danbury, in the county of Fairfield, and State of Connecticut, have invented a new and improved Hat, of which the following is a full, clear, and exact description.

Previously to describing my improved hat, which is composed of wool felt, having fur dust combined with it, or rather before specifying how the same is or may be made, it may be observed that in the manufacture of fur hats or other fur goods, or in preparing fur for the same, there is always a large amount of extremely short waste or refuse, which is known as fur dust, and is usually regarded as worthless, except as manure. My invention utilizes such material by incorporating it with wool felt in the manufacture of hats, and whereby a new article of manufacture is produced, forming a greatly superior hat at little or no extra expense to one made of wool felt only.

In carrying out the invention the fur dust may be introduced for combination with the wool felt at any or different and progressive stages in the felting process, or after formation of the bat which goes to form the hat; but I find that it is not practicable without reducing tenacity, which is objectionable, and cannot evenly be laid, to apply the fur dust to the bat in the process of forming the latter on the cone, but only after the formation of the bat, or during the felting operation. Thus, for instance, or by way of illustration, I apply, by sprinkling or otherwise, the fur dust to the bat or body after it has been formed on the cone, say after said body comes off the cone or "former," and has been slightly felted. At this stage in the manufacture of a wool hat the fur dust may be incorporated with the bat or body in various ways, as, for instance, when the same is in the fulling-stocks, by throwing or feeding in a certain amount of the dust; or the bats or bodies, during the process of their being felted, may be enclosed with the necessary amount of fur dust in a revolving cylinder, so as to incorporate the dust with the bodies, which operation may be repeated at different and progressive stages during the process of felting.

By this application of fur dust, while all the advantages and peculiarities of wool felt are retained for the hat, a great improvement is made at little or no additional expense in the quality or gloss and smoothness or finish, also weight or heft of the article, forming in fact a new and superior description of hat. The fur dust also has the property of preventing matting or felting of the opposite or contiguous surfaces of the body, thereby economizing labor by reducing the necessity of so frequently crozing, and likewise lessening the labor of pouncing or surfacing, as usual in the manufacture of wool-felt hats.

Having thus described my invention, I claim as a new and useful article of manufacture—

A hat made of wool felt, having incorporated with it, after the bat is formed, or during the process of felting, fur dust, substantially as herein set forth.

W. B. LODGE.

Witnesses:
    OLIVER A. G. TODD,
    WM. RANDALL.